US007272488B2

(12) United States Patent
Hayashi et al.

(10) Patent No.: US 7,272,488 B2
(45) Date of Patent: Sep. 18, 2007

(54) LEAK DETECTING DEVICE FOR FUEL VAPOR TREATMENT UNIT

(75) Inventors: Takane Hayashi, Yokohama (JP); Takeshi Tsuyuki, Yokohama (JP); Hiroya Ishii, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 288 days.

(21) Appl. No.: 11/141,396

(22) Filed: Jun. 1, 2005

(65) Prior Publication Data

US 2005/0262932 A1 Dec. 1, 2005

(30) Foreign Application Priority Data

Jun. 1, 2004 (JP) ............................ 2004-162942

(51) Int. Cl.
*G06F 19/00* (2006.01)
*G01M 19/00* (2006.01)

(52) U.S. Cl. ...................................... 701/114; 73/118.1

(58) Field of Classification Search ................ 701/103, 701/114; 73/40, 40.7, 49.1, 49.2, 49.3, 49.7, 73/116, 118.1, 119 A; 123/198 D, 518–520
See application file for complete search history.

(56) References Cited

U.S. PATENT DOCUMENTS 3,521,704 A * 7/1970 Bridegum .................... 165/70
5,315,980 A * 5/1994 Otsuka et al. .............. 123/520
5,355,863 A * 10/1994 Yamanaka et al. .......... 123/520
5,715,786 A * 2/1998 Seiberth ................. 123/198 D
5,739,421 A * 4/1998 Iochi et al. .................. 73/49.7
6,192,742 B1 * 2/2001 Miwa et al. .................... 73/40
6,276,343 B1 * 8/2001 Kawamura et al. .......... 123/520
6,964,193 B2 * 11/2005 Kobayashi et al. ........ 73/118.1
7,077,112 B2 * 7/2006 Mitani et al. ............... 123/518
2005/0044935 A1 * 3/2005 Barrera et al. ............. 73/118.1
2007/0044549 A1 * 3/2007 Yoshioka et al. .......... 73/118.1

FOREIGN PATENT DOCUMENTS

JP 2003-056416 A 2/2003
JP 2003-074422 A 3/2003
JP 2003-083175 A 3/2003

* cited by examiner

*Primary Examiner*—Willis R. Wolfe, Jr.
(74) *Attorney, Agent, or Firm*—Foley & Lardner LLP

(57) ABSTRACT

Disclosed is a leak detecting device for a fuel vapor treatment unit that purges a vapor gas generated through evaporation of fuel in a fuel tank (2) into an intake system (22) of an engine (21). The leak detecting device includes a valve (5) that can selectively seal the fuel vapor treatment unit; a pressure detecting sensor (8) that detects a pressure in the fuel vapor treatment unit; and a controller (10). The controller (10) is programmed to: issue a command to close the valve (5) with a view to sealing the fuel vapor treatment unit during stoppage of the engine (21); calculate deviation amounts ($P-P_0$) of the detected pressures during stoppage of the engine (21) after the fuel vapor treatment unit has been sealed; integrate absolute values ($|P-P_0|$) of the deviation amounts, and determine, based on an integrated value (s), whether or not there is a leak occurring in the fuel vapor treatment unit.

9 Claims, 7 Drawing Sheets

LEAK DETECTING DEVICE FOR FUEL VAPOR TREATMENT UNIT

FIELD OF THE INVENTION

This invention relates to a leak detecting device that detects a failure in a fuel vapor treatment unit for treating fuel vapors. In particular, the fuel vapor treatment unit purges fuel vapors generated in a fuel tank mounted in a vehicle to an intake system of an engine. The leak detecting device detects a leak of fuel vapors from the fuel vapor treatment unit.

BACKGROUND OF THE INVENTION

JP 2003-56416 A published by Japan Patent Office in 2003 discloses a conventional leak diagnosis device (or leak detecting device) for a fuel vapor treatment unit. This leak diagnosis device periodically integrates detected internal pressures of an evaporation system and makes a determination on a leak from the evaporation system on the basis of an integrated value. A leak diagnosis is carried out herein for a period in which a “positive pressure” is maintained when the evaporation system is sealed immediately after stoppage of an engine, or for a period shorter than that period.

By the same token, JP 2003-74422 A published by Japan Patent Office in 2003 discloses a conventional leak diagnosis device. This leak diagnosis device carries out a leak diagnosis by comparing an integrated value, which is obtained by periodically integrating internal pressures of a fuel vapor treatment unit, with a leak criterion value during a leak diagnosis period. It should be noted herein the leak diagnosis period means a period in which a “positive pressure” is maintained when an evaporation system is sealed immediately after stoppage of an engine, or for a period shorter than that period. Moreover, when the internal pressure of the system becomes equal to or higher than a predetermined pressure during the leak diagnosis period, the leak diagnosis device temporarily opens the system. Thus, a large amount of a vapor gas is prevented from being discharged to outside air when the fuel vapor treatment unit is opened to outside air after termination of the leak diagnosis.

The aforementioned conventional arts are based on the premise that the pressure in the evaporation system rises and becomes positive when the evaporation system is sealed immediately after the engine has been stopped. This is because an exhaust system is at a high temperature and a large amount of the vapor gas is generated immediately after the engine has been stopped. However, when the engine is operated for a long period, highly evaporable light components in fuel have already evaporated, and the generation amount of the vapor gas after stoppage of the engine is small. In this case, the pressure in the evaporation system may become negative as the evaporation system is cooled after the engine has been stopped. Thus, since the pressure in the evaporation system is not always positive, the aforementioned conventional arts sometimes make it difficult to carry out the leak diagnosis appropriately.

SUMMARY OF THE INVENTION

It is therefore an object of this invention to provide a leak detecting device for a fuel vapor treatment unit which is capable of diagnosing a leak more accurately.

In order to achieve the above object, this invention provides a leak detecting device for a fuel vapor treatment unit that purges a vapor gas generated through evaporation of fuel in a fuel tank into an intake system of an engine. The leak detecting device comprises a valve that can selectively seal the fuel vapor treatment unit; a pressure detecting sensor that detects a pressure in the fuel vapor treatment unit; and a controller. The controller is programmed to: issue a command to close the valve with a view to sealing the fuel vapor treatment unit during stoppage of the engine; calculate deviation amounts of the detected pressures during stoppage of the engine after the fuel vapor treatment unit has been sealed; integrate absolute values of the deviation amounts, and determine, based on an integrated value, whether or not there is a leak occurring in the fuel vapor treatment unit.

The details as well as other features and advantages of this invention are set forth in the remainder of the specification and are shown in the accompanying drawings.

DESCRIPTION OF THE PREFERRED EMBODIMENTS

Figure 1:
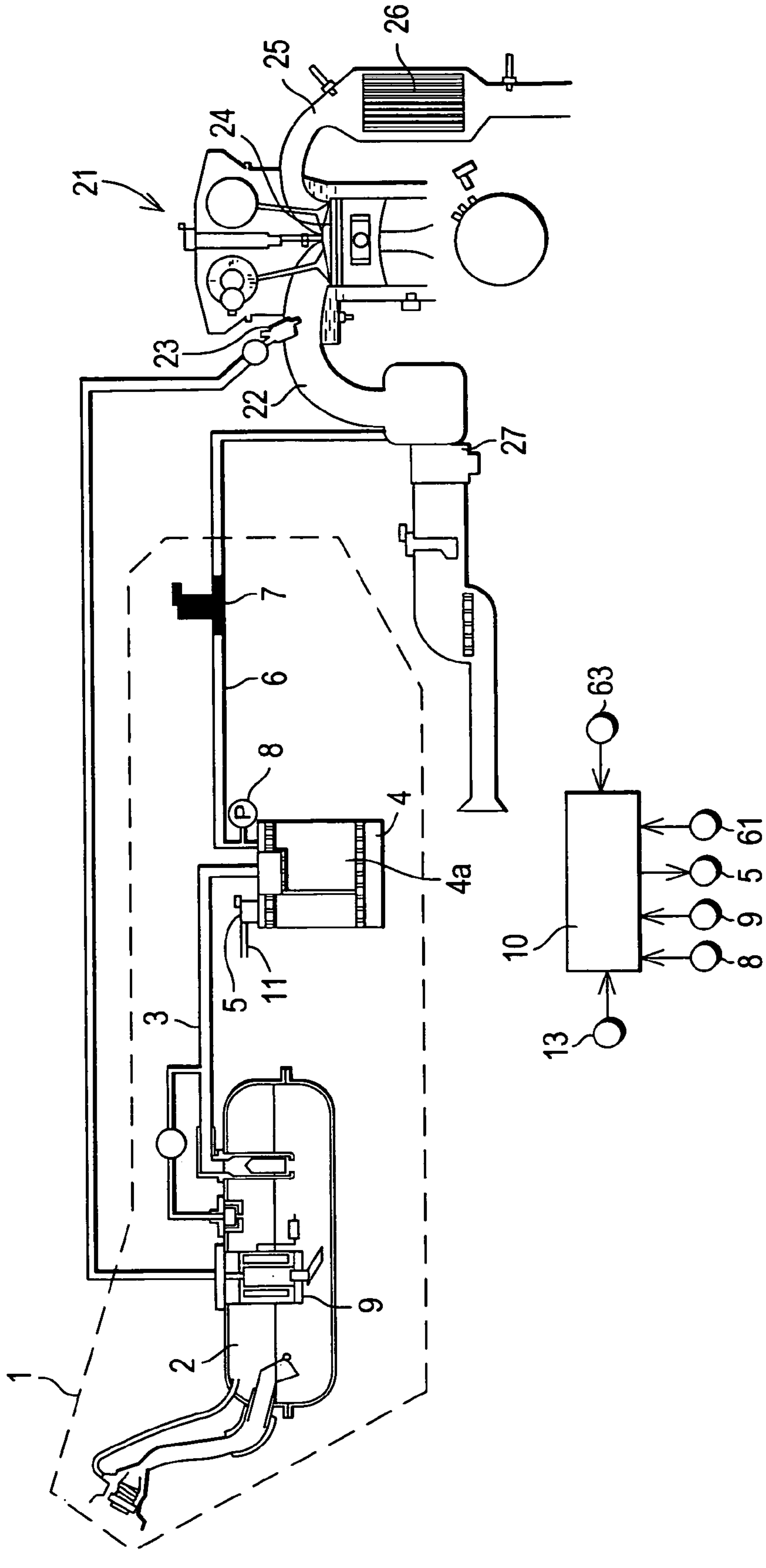
FIG. 1 is a schematic diagram of a fuel vapor treatment unit employed in a first embodiment.

Referring to FIG. 1, the construction of a leak detecting device of a first embodiment will be described. The leak detecting device detects a leak of fuel vapors from an evaporation system 1 of a fuel vapor treatment unit. The fuel vapor treatment unit purges a vapor gas generated in a fuel tank 2 to an intake pipe (or intake system) 22 of an engine 21. The evaporation system 1 is composed of parts arranged from the fuel tank 2 to a purge valve 7.

The evaporation system 1 of the fuel vapor treatment unit comprises the fuel tank 2, a vent line 3 connecting to the fuel tank 2, and a canister 4 connected to the fuel tank 2 via the vent line 3. The canister 4 accommodates an adsorbent **4*a* such as an activated carbon for adsorbing the vapor gas. The canister 4 is provided, opposite its portion connecting to the vent line 3, with an outside air open passage 11. The vapor gas is sent to a bottom portion of the canister 4 through a pipe, then passes from a bottom portion to an upper portion of the adsorbent 4*a*, and reaches the outside air open passage 11. The canister 4 is provided, in the outside air open passage 11, with a vent cut valve 5 which is a normally closed electromagnetic valve. The vent cut valve 5 functions as a part for selectively sealing the inside of the evaporation system 1 or fuel vapor treatment unit. The leak detecting device includes the vent cut valve 5**.

Fuel from the fuel tank 2 is injected by a fuel injector 23 provided in the intake pipe 22 of the engine 21. Air flows into the intake pipe 22 according to an opening degree of a throttle valve 27. This air and the fuel injected from the fuel injector 23 are supplied together to a combustion chamber 24 of the engine 21. An exhaust gas produced after combustion passes through an exhaust pipe 25 and is purified in a catalyst 26.

In addition, a purge passage 6 for purging the vapor gas adsorbed by the adsorbent 4*a* of the canister 4 to the intake pipe 22 is provided between the canister 4 and the intake pipe 22. The purge passage 6 is connected to the intake pipe 22 downstream of the throttle valve 27. The purge passage 6 is provided with a purge valve 7 which is a normally closed electromagnetic valve.

The leak detecting device comprises a pressure sensor 8 for detecting a pressure between the fuel tank 2 and the purge valve 7. Especially, the pressure sensor 8 detects a pressure in the neighborhood of a connecting portion between the canister 4 and the purge passage 6. The pressure sensor 8 is not limited to this construction and may be so constructed as to detect a pressure in the fuel tank 2. The leak detecting device further comprises a temperature sensor 9 for detecting a temperature in the fuel tank 2. The temperature sensor 9 detects a temperature of fuel in the fuel tank 2. Furthermore, the leak detecting device comprises an outside air temperature sensor 13 for detecting a temperature of air outside the evaporation system 1.

The leak detecting device comprises a controller 10 for diagnosing a failure in the evaporation system 1. The controller 10 controls the opening and closing of the vent cut valve 5 when the engine 21 is stopped. The controller 10 detects whether an engine key switch 61 is ON or OFF, and determines that the engine 21 is stopped when the engine key switch 61 is OFF. The controller 10 receives signals from the pressure sensor 8, the temperature sensor 9, and the outside air temperature sensor 13, and determines, on the basis of the signals, whether or not there is a leak from the evaporation system 1.

The controller 10 includes a microcomputer having a central processing unit (CPU), a random access memory (RAM), a read-only memory (ROM), an input/output (I/O) interface, and a timer or timers. The read-only memory (ROM) may be a programmable ROM.

To be prevented from leaking to the outside air, the vapor gas of fuel generated in the fuel tank 2 is introduced into the canister 4 through the vent line 3 and adsorbed by the adsorbent 4*a*. The vapor gas, whose flow rate is adjusted to a predetermined flow rate by controlling an opening degree of the purge valve 7 provided in the purge passage 6, is purged from the canister 4 toward the intake pipe 22 that is in a negative pressure state when the engine 21 is operated. Thus, the vapor gas is restrained from leaking to the outside air.

When micro holes (hereinafter referred to as leak holes) are formed in part of the vent line 3, the purge passage 6, or the like, the vapor gas leaks to the outside air. When this vapor gas is left to leak for a long time, the outside air is polluted. In diagnosing a leak, therefore, it is diagnosed whether or not there is a leak hole formed in the evaporation system 1.

A leak from the evaporation system 1 is diagnosed on the basis of an evaporation system pressure P that is detected when the evaporation system 1 is sealed. The evaporation system pressure P is a pressure in the evaporation system 1. Because the vapor gas cannot be introduced into the intake pipe 22 from the canister 4 during a diagnosis of a leak, the adsorption performance of the canister 4 deteriorates. In diagnosing a leak while driving a vehicle, therefore, the frequency of the diagnosis is limited. While driving, the state of the vapor gas in the fuel tank 1 changes due to external factors such as an operation of an accelerator pedal by a driver of the vehicle, a running state, and a running environment, which makes it difficult to accurately diagnose a leak.

Therefore, in this embodiment, the vent cut valve 5 and the purge valve 7 close while the engine 21 is stopped, whereby a diagnosis of a leak is carried out with the evaporation system 1 being sealed while the engine 21 is stopped.

Figure 2A:
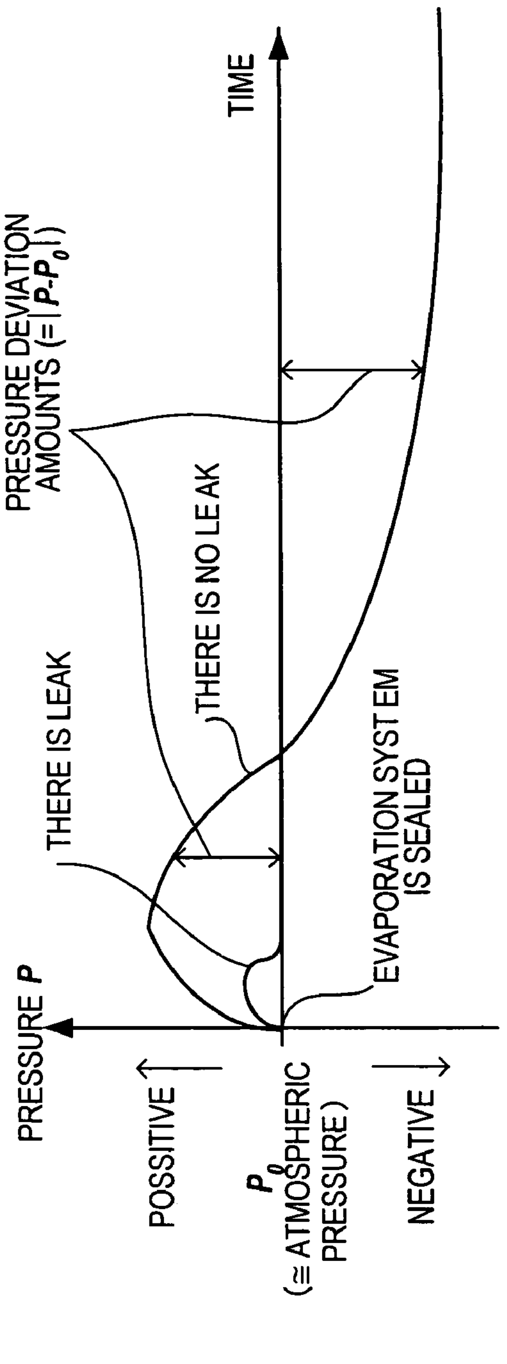
FIG. 2A is a graph showing an example of time-dependent changes in an evaporation system pressure in the first embodiment.

FIG. 2A shows an example of changes in pressure in the sealed evaporation system 1 after the engine 21 has been stopped.

In the case where there is no leak occurring in the evaporation system 1, when the evaporation system 1 is sealed immediately after stoppage of the vehicle and stoppage of the engine 21, the evaporation system pressure P immediately after the sealing of the evaporation system 1 rises. This is because the cooling of the fuel tank 2 by a flow of air resulting from the running of the vehicle is finished as soon as the vehicle stops. In other words, after the engine 21 has stopped, the temperature of a gas phase in the fuel tank 2 rises, and the temperature of fuel rises. As a result, the amount of the vapor gas as fuel vapors increases and the evaporation system pressure P rises. After that, since the temperature in the fuel tank 2 falls as the fuel tank 2 is cooled by outside air, the evaporation system pressure P gradually decreases. At this moment, the vapor gas evaporated in the gas phase in the fuel tank 2 condenses, and the evaporation system pressure P further decreases.

Because the evaporation system 1 is sealed when the engine is stopped, the evaporation system pressure P in this stage is negative when there is no leak occurring in the evaporation system 1. However, when there is a leak occurring in the evaporation system 1, the evaporation system pressure P in this stage is approximately equal to an atmospheric pressure. In other words, a temporary rise in pressure results from evaporation of a large amount of fuel immediately after the engine 21 has stopped, but the evaporation system pressure P falls and becomes approximately equal to the atmospheric pressure as the generation amount of fuel vapors decreases. Moreover, even when the temperature of the evaporation system 1 falls, outside air is introduced from the leak holes formed in the evaporation system 1. Therefore, the fall in pressure resulting from the fall in temperature is relatively gentle, and the evaporation system pressure P is maintained approximately at the atmospheric pressure. Thus, when there is a leak occurring, only a positive pressure is detected immediately after the engine 21 has stopped, and no negative pressure is detected or there is a relatively low negative pressure.

It should be noted that a pressure change pattern in the evaporation system 1 is not limited to the above mentioned pattern. This is because a change in pressure differs depending on a fuel composition, a driving history, a fuel temperature, an outside air temperature, and an outside air pressure. For instance, in the case of a very short driving time, the amount of rise in temperature and the amount of rise in pressure in the evaporation system 1 are small, or there is no rise in temperature or pressure immediately, after the engine has stopped. After the vehicle has been driven for a certain period, the amount of highly evaporable light components decreases in fuel, and the vapor gas becomes unlikely to be produced. Consequently, a rise in pressure becomes unlikely.

Figure 3:
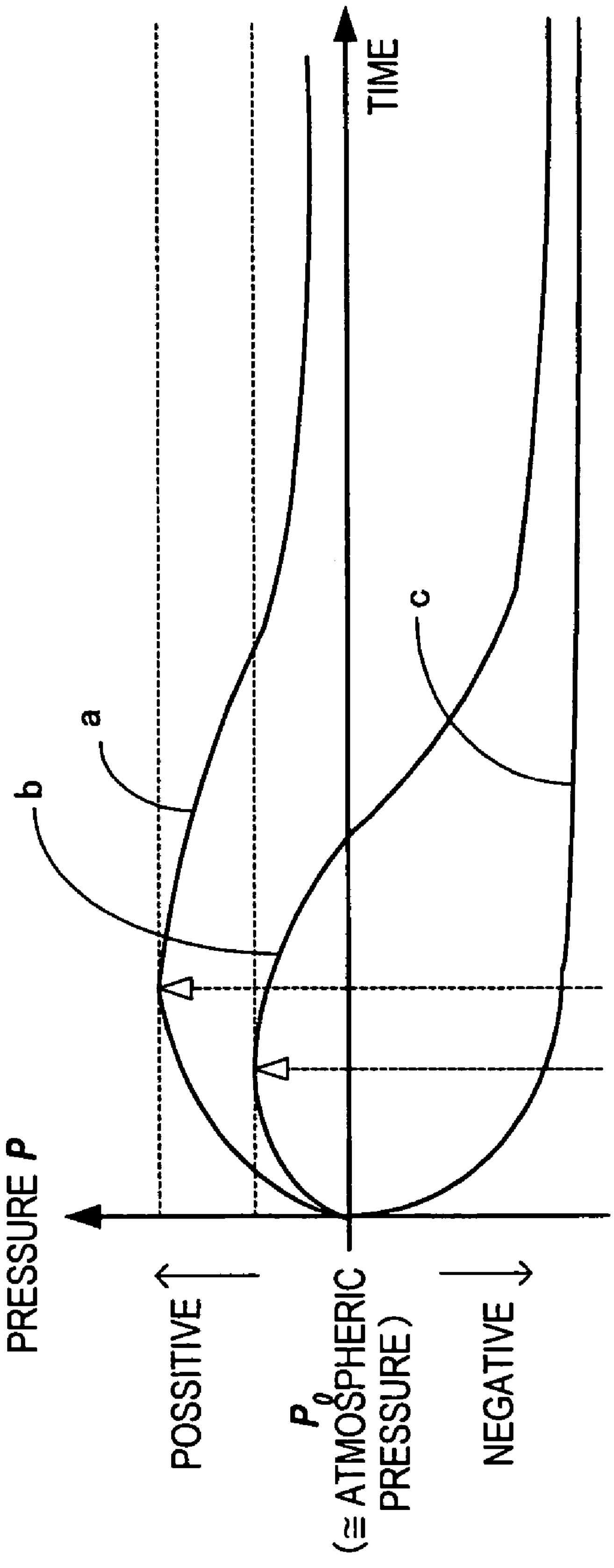
FIG. 3 is a graph showing various examples of time-dependent change patterns of the evaporation system pressure in the first embodiment.

Thus, as shown in FIG. 3, even when the evaporation system 1 is sealed after the engine 21 has stopped, the pressure may rise immediately after the sealing of the evaporation system 1 instead of becoming negative, as indicated by "a" in FIG. 3. Alternatively, the pressure may become negative at the beginning instead of rising, as indicated by "c" in FIG. 3. In this embodiment, therefore, an accurate leak diagnosis is carried out by comparing an integrated value (or totalized value) of absolute values $|P-P_0|$ of pressure deviation amounts $(P-P_0)$ with a leak criterion value. More specifically, a differential pressure between a reference pressure $P_0$ and an evaporation system pressure P is calculated as a pressure deviation amount $(P-P_0)$. It should be noted herein that the reference pressure $P_0$ is a pressure in starting to seal the evaporation system 1, which is usually equal to the atmospheric pressure approximately. After that, an integrated value s obtained by integrating differential pressures is compared with a leak criterion value $s_0$ on a calculation cycle $B_0$. For example, the leak criterion value $s_0$ is 1200 kPa·second. When the integrated value s is equal to or larger than the leak criterion value $s_0$, it is determined that there is no leak occurring. On the other hand, when the integrated value s is smaller than the leak criterion value $s_0$, it is determined that there is a leak occurring. When the integrated value s is smaller than the leak criterion value $s_0$, the vapor gas leaks to outside air, or outside air is introduced into the evaporation system 1 and suppresses a change in pressure.

Figure 4:
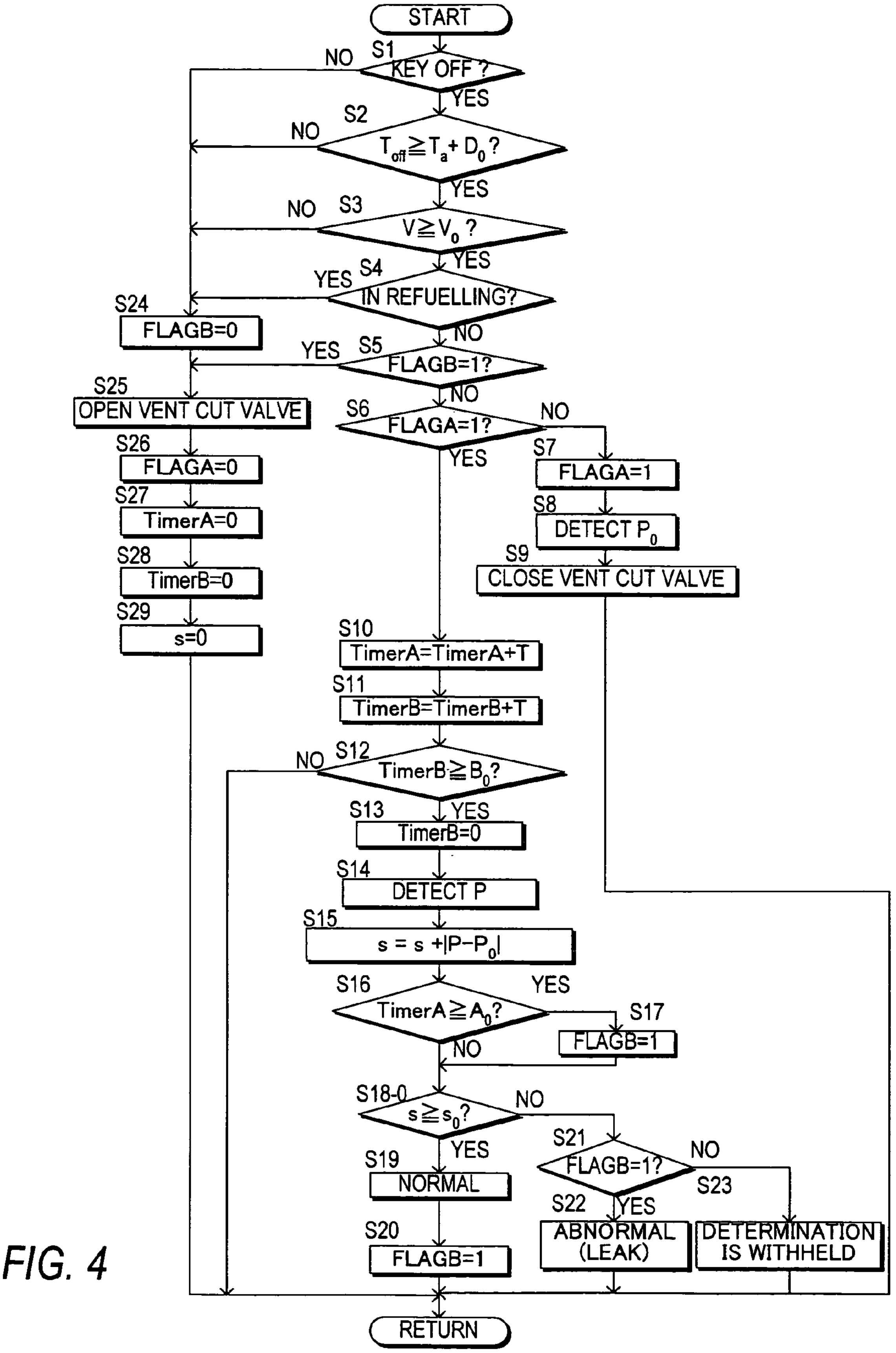
FIG. 4 is a flowchart showing a leak diagnosis routine in the first embodiment.

With reference to a flowchart of FIG. 4, a leak diagnosis routine will be described. The controller 10 repeatedly executes this leak diagnosis routine as a program at intervals of an execution period T, which is 10 milliseconds for example but not limited to this value.

First in steps S1 to S5, it is determined whether or not diagnosis permitting conditions are fulfilled. In the step S1, it is determined whether or not the engine key switch 61 is off, that is, whether or not the engine 21 is stopped. When the engine key switch 61 is not off, a leak diagnosis is not carried out and the routine proceeds to a step S24 where FLAGB is set to 0 (FLAGB=0). FLAGB is a flag indicating whether or not the diagnosis has been finished. When FLAGB is 0, it indicates that the diagnosis during stoppage of the engine 21 has not been finished yet. When FLAGB is 1, it indicates that the diagnosis has already been finished.

When it is determined in the step S1 that the engine key switch 61 is off, the routine proceeds to the step S2. In the step S2, it is determined whether or not a fuel temperature $T_{off}$ at the time when the engine key switch 61 is turned off is higher than an outside air temperature $T_a$ at the time when the engine key switch 61 is turned off by a predetermined value $D_0$ or more. The predetermined value $D_0$ is set such that a sufficiently detectable pressure change is caused after the temperature $T_{off}$ has fallen by the predetermined value $D_0$. When the temperature $T_{off}$ is below a reference temperature that is the sum of the outside air temperature $T_a$ and the predetermined value $D_0$ ($T_{off}<T_a+D_0$), no sufficient pressure change has been caused, so the routine proceeds to the step S24. In the step S24, FLAGB is set to 0. When the temperature $T_{off}$ is equal to or higher than the reference temperature ($T_{off}\geqq T_a+D_0$), the routine proceeds to the step S3.

In the step S3, it is then determined whether or not a voltage V of a power supply (not shown) is equal to or higher than a predetermined value $V_0$. The leak detecting device may comprise a sensor 63 for detecting the voltage V of the power supply. The predetermined value $V_0$ is a power value required for starting the vehicle. During the leak diagnosis, a power for closing the vent cut valve 5 including the normally closed electromagnetic valve, a power for operating the pressure sensor 8 and the temperature sensor 9, and a power for operating the controller 10 are consumed. Thus, in order to prevent the leak diagnosis from being carried out when the power supply voltage is lower than the predetermined value $V_0$, the routine proceeds to the step S24 where FLAGB is set to 0 (FLAGB=0), so as to save energy of the power supply.

When the power supply voltage V is equal to or higher than the predetermined value $V_0$ in the step S3, the routine proceeds to the step S4 where it is determined whether or not the vehicle is being refueled. The leak detecting cevice may comprise a fuel amount sensor for detecting a fuel amount in the fuel tank 2 and the controller 10 may calculate the change rate of the fuel amount so as to determine whether or not the vehicle is being refueled. When the vehicle is being refueled, the evaporation system 1 cannot be sealed, and therefore, the leak diagnosis cannot be carried out. Thus, when the vehicle is being refueled, FLAGB is set to 0 in the step S24. When the vehicle is not being refueled, the routine proceeds to the step S5. In the step S5, it is determined whether or not FLAGB is 1. When FLAGB is 1, the leak diagnosis has already been finished and thus is not carried out.

In this manner, when any one of the diagnosis permitting conditions in the steps S1 to S5 is not fulfilled, the routine proceeds to a step S25. In the step S25, the vent cut valve 5 is opened, so the evaporation system 1 is opened. In other words, the controller 10 sends to the vent cut valve 5 a command signal for opening the vent cut valve 5. Then in a step S26, FLAGA is set to 0 (FLAGA=0). FLAGA is a flag indicating whether or not the leak diagnosis is being carried out, i.e. whether the vent cut valve 5 is opened or closed. When FLAGA is 1, the leak diagnosis is being carried out, i.e. the vent cut valve 5 is closed. When FLAGA is 0, the leak diagnosis is not being carried out, i.e. the vent cut valve 5 is opened. In addition, the routine proceeds to a step S27 where a timer value TimerA is set to 0 (TimerA=0). The timer value TimerA represents a duration period of the leak diagnosis. More specifically, the timer value TimerA represents an elapsed time after the issuance of a command to seal the vent cut valve 5 in a step S9 or an elapsed time after the detection of a reference pressure $P_0$ in a step S8. Then in a step S28, a timer value TimerB is set to 0 (TimerB=0). The timer value TimerB is a timer value for counting or measuring a calculation cycle $B_0$ for pressure integration. In a step S29, the integrated value s of absolute values $|P-P_0|$ of pressure deviation amounts $P-P_0$ is reset to 0 (s=0). Thus, when the leak diagnosis is not carried out, the routine is terminated after the processings in the steps S25 to S29 have been performed.

On the other hand, when all the diagnosis permitting conditions in the steps S1 to S5 are fulfilled, the leak diagnosis is carried out.

In a step S6, it is determined whether or not FLAGA is 1. When FLAGA is not 1, namely, when the leak diagnosis has not been continued up to now and the vent cut valve 5 is open, the routine proceeds to a step S7. In the step S7, FLAGA is set to 1 so as to start the leak diagnosis (FLAGA=1) by closing the vent cut valve 5. In the step S8, the evaporation system pressure P is detected and stored into the memory (e.g. the RAM) as the reference pressure $P_0$. Because the evaporation system 1 is open to outside air when the engine is in operation, the reference pressure $P_0$ is usually equal to the atmospheric pressure approximately. Then in the step S9, the evaporation system 1 is sealed by closing the vent cut valve 5. In other words, the controller 10 sends to the vent cut valve 5 a command signal for closing the vent cut valve 5. After the evaporation system pressure P at the time when the evaporation system 1 is sealed has been set to the reference pressure $P_0$, the leak diagnosis is started. The routine is terminated after the step S9. Since FLAGA is equal to 1 (FLAGA=1) now, when the routine is executed next time, the routine bypasses the steps S7 to S9 and proceeds from the step S6 to a step S10.

When the leak diagnosis has been continued (i.e., when FLAGA is set to 1) in the step S6, the routine proceeds to the step S10. In the step S10, the timer value TimerA is increased by a predetermined time T. In other words, TimerA=TimerA+T. Then in a step S11, a timer value TimerB for counting the calculation cycle $B_0$ for integration is increased by the predetermined time T. In other words, TimerB=TimerB+T. The predetermined time T is the execution period T of the routine.

In a step S12, it is then determined whether or not the timer value TimerB is equal to or larger than a predetermined value $B_0$. The predetermined value $B_0$ is set in advance as the calculation cycle $B_0$ for integrating absolute values $|P-P_0|$ of pressure deviation amounts. In other words, absolute values of pressure deviation amounts from the reference pressure $P_0$ are integrated on the calculation cycle $B_0$. When the timer value TimerB is smaller than the predetermined value $B_0$, the routine is terminated. When the timer value TimerB is equal to or larger than the predetermined value $B_0$, the routine proceeds to a step S13 so as to integrate absolute values of pressure deviation amounts.

In the step S13, the timer value TimerB is reset to 0 (TimerB=0). In a step S14, an evaporation system pressure P is detected. Then in a step S15, an integrated value s of the absolute values $|P-P_0|$ of the pressure deviation amounts $P-P_0$ from the reference pressure $P_0$ is calculated. In other words, $s=s+|P-P_0|$. The integrated value s is usually proportional to the time integral of the absolute value $|P-P_0|$ of the pressure deviation amount. The integrated value s has an initial value of zero.

In a step S16, it is determined whether or not the timer value TimerA is equal to or larger than a predetermined value $A_0$. The predetermined value $A_0$ is a maximum duration period of the leak diagnosis, and the integration of pressure deviations lasts for this period. For example, the predetermined value corresponds to 60 minutes. When the integrated value s of the pressure deviation amounts is not sufficiently large immediately after the timer value TimerA has become the predetermined value $A_0$, it is determined that there is a leak occurring. By setting the predetermined value $A_0$, power is restrained from being excessively consumed due to the leak diagnosis. When TimerA is equal to or larger than the predetermined value $A_0$, the routine proceeds to a step S17 where FLAGB is set to 1 (FLAGB=1). After the timer value TimerA has reached the predetermined value $A_0$, the leak determination or leak detection is carried out and then the leak diagnosis terminated. On the other hand, when TimerA is smaller than the predetermined value $A_0$, FLAGB remains 0, and the routine proceeds to a step S18.

Figure 2B:
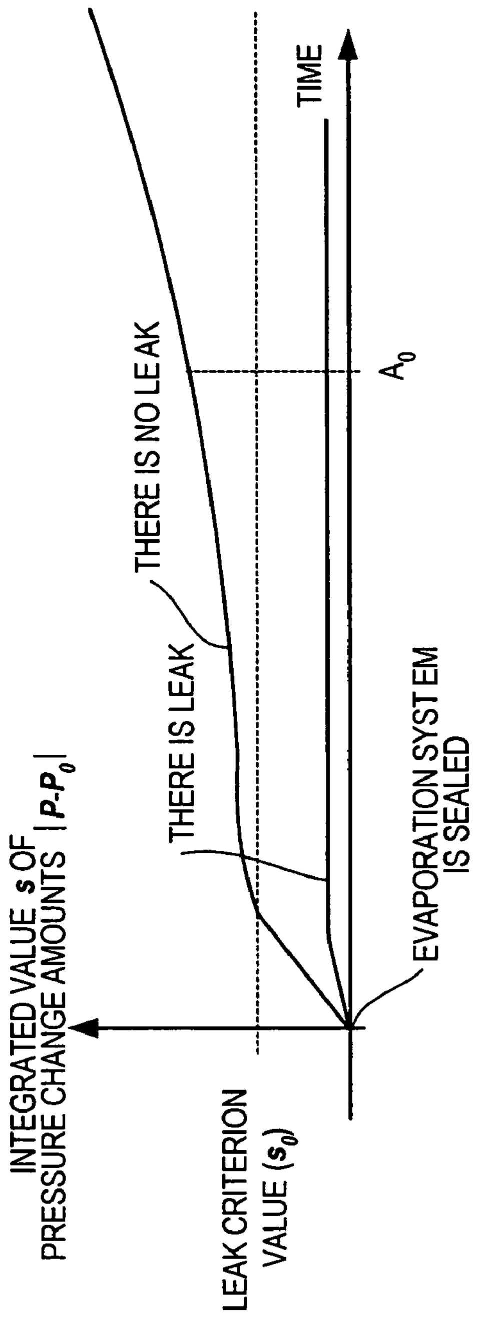
FIG. 2B is a graph showing an example of time-dependent changes in a pressure integrated value.

In the step S18, it is then determined whether or not the integrated value s of the pressure deviation amounts is equal to or larger than a predetermined value $s_0$. The predetermined value $s_0$ (leak criterion value) corresponds to the integrated value s of the absolute values of the pressure deviation amounts at the time when the fuel temperature T falls by the predetermined value $D_0$ in a normal state with no leak, and is calculated in advance through an experiment or the like. For instance, the predetermined value $s_0$ is 1200 kPa·second. As shown in FIG. 2A, when there is a leak occurring, a pressure change occurs only immediately after the evaporation system 1 has been sealed, and then, only no pressure change or a minor pressure change is caused. As shown in FIG. 2B, as a long time elapses, the integrated value s in the case where there is a leak occurring differs greatly from the integrated value s in the case where there is no leak occurring. Thus, the accuracy in detecting a leak is ensured by integrating absolute values of pressure deviation amounts for the long period $A_0$ while the engine key switch 61 is off. Even if the pressure change pattern is diverse as described above, the integrated value s of absolute values of pressure deviation amounts is larger in the case where there is no leak occurring than in the case where there is a leak occurring.

When the integrated value s of pressure deviation amounts is equal to or larger than the predetermined value $s_0$ in the step S18, the routine proceeds to a step S19 where it is determined that the evaporation system 1 is normal. Then in a step S20, FLAGB is set to 1 (FLAGB=1), and the routine is terminated. On the other hand, when the integrated value s of pressure deviation amounts is smaller than the predetermined value $s_0$ in the step S18, the routine proceeds to a step S21 where it is determined whether or not FLAGB is 1. In other words, it is determined whether or not the period $A_0$ in which pressure deviations should be integrated has elapsed, i.e. whether or not an elapsed time after the issuance of a command to seal the vent cut valve 5 is equal to or larger than the predetermined value $A_0$. When FLAGB is 1, the routine proceeds to a step S22. In the step S22, it is determined that there is a leak occurring in the evaporation system 1 and that the evaporation system 1 is in an abnormal state. On the other hand, when FLAGB is 0, that is, when TimerA is smaller than the predetermined value $A_0$, the routine proceeds to a step S23. In the step S23, a determination that there is a leak occurring is withheld and the leak diagnosis is continued.

As described hitherto, the leak diagnosis is carried out by integrating absolute values of pressure deviation amounts for the relatively long period $A_0$ and comparing the integratged value s with the predetermined value so as a leak criterion value. Thus, regardless of a pattern of time-dependent pressure changes, it is possible to accurately determine whether or not there is a leak occurring. Therefore, the leak diagnosis is carried out with a relatively great frequency.

Next, the effect of this embodiment will be described.

The leak detecting device of the fuel vapor treatment unit comprises a pressure integration part (the step S15) for calculating the integrated value s obtained by integrating absolute values $|P-P_0|$ of pressure deviation amounts detected during stoppage of the engine 21 and a leak diagnosis part (the steps S18 to S23) for determining from the integrated value s whether or not there is a leak occurring. By integrating absolute values $|P-P_0|$ of pressure deviation amounts, a leak is accurately diagnosed regardless of a time-dependent pressure change pattern. In particular, even when the pressure in the evaporation system 1 is negative, it is possible to accurately determine whether or not there is a leak occurring.

The pressure integration part (the step S15) integrates absolute values of differences between the evaporation system pressure P detected by the pressure sensor 8 and the reference pressure $P_0$ which is a pressure in the evaporation system 1 at the time point when the controller 10 sends to the vent cut valve 5 a command signal for closing the vent cut valve 5. The reference pressure $P_0$ is substantially equal to the atmospheric pressure. Therefore, when there is a leak occurring, the evaporation system pressure P is close to the reference pressure $P_0$ and the integrated value s is small. On the contrary, when there is no leak occurring, the integrated value s is large. Thus, the leak diagnosis can be accurately carried out regardless of a pressure change pattern.

The leak detecting device further comprises a timer (the step S10) for counting a duration time of the leak diagnosis. When the pressure integration value s remains smaller than the predetermined leak criterion value so after the duration time TimerA has reached a predetermined upper-limit time $A_0$, it is determined that there is a leak occurring. By thus carrying out a leak diagnosis within the predetermined upper-limit time $A_0$, the diagnosis can be prevented from being continued meaninglessly. Moreover, by suitably restraining the duration time of the leak diagnosis, the integrated value s is prevented from becoming too large through a large number of times of repetition of integration when there is a leak occurring. It is thus possible to eliminate a possibility of erroneously determining that there is no leak occurring.

Next, a leak detecting device of a second embodiment will be described. The evaporation system 1 is identical in construction with that of the first embodiment. The following description will mainly focus on what is different from the first embodiment.

Figure 5:
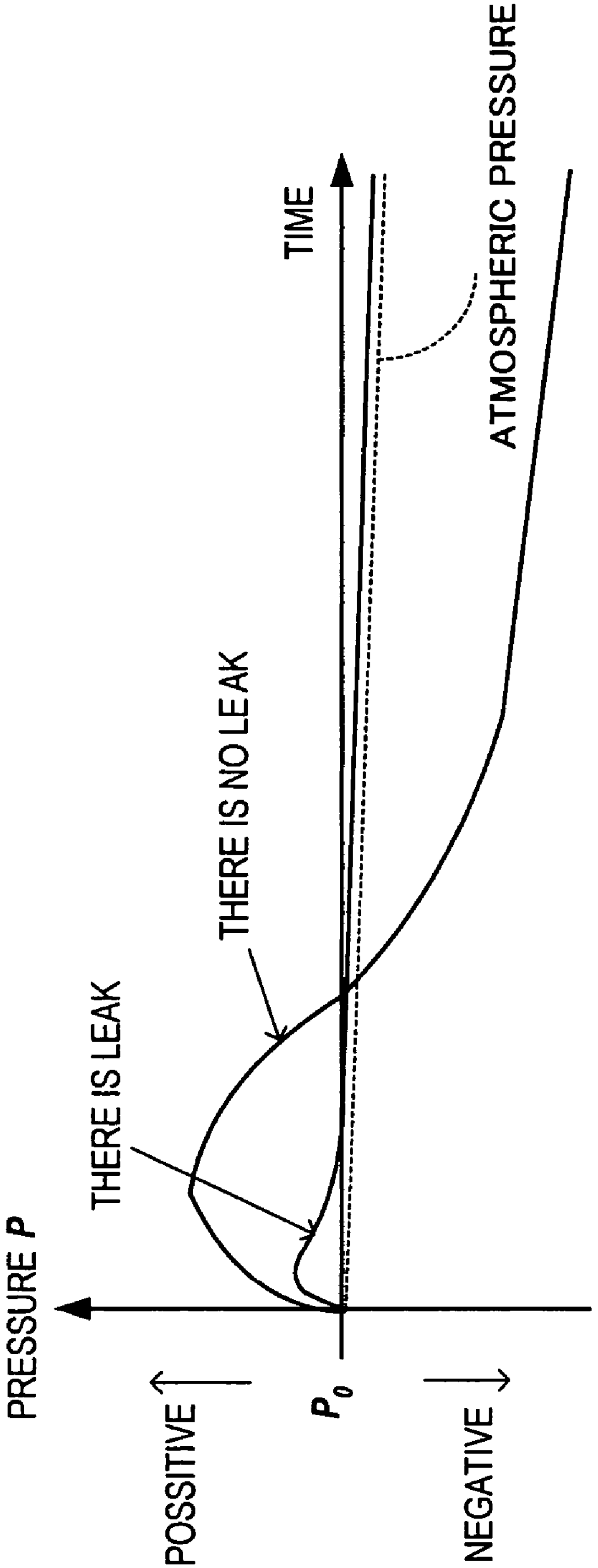
FIG. 5 is a diagram showing various examples of time-dependent change patterns of an evaporation system pressure in a second embodiment.

After the engine key switch 61 has turned off, the atmospheric pressure may change as a result of, for example, a change in outside air temperature. As shown in FIG. 5, even when there is a leak occurring, the evaporation system pressure P changes as the atmospheric pressure changes, so the integrated value s of pressure deviation amounts becomes relatively large. Thus, there is a possibility of erroneously determining that there is no leak occurring.

In this embodiment, a change in the evaporation system pressure P resulting from a change in the atmospheric pressure is distinguished from a change in the evaporation system pressure P resulting from a change in vapor gas amount or temperature in the evaporation system 1, so a leak diagnosis is restrained from being made erroneously. In general, the atmospheric pressure changes more gently than the pressure in the evaporation system 1 in the case where there is no leak occurring. Accordingly, absolute values of pressure deviation amounts are integrated only when the pressure changes at a relatively high speed.

Figure 6:
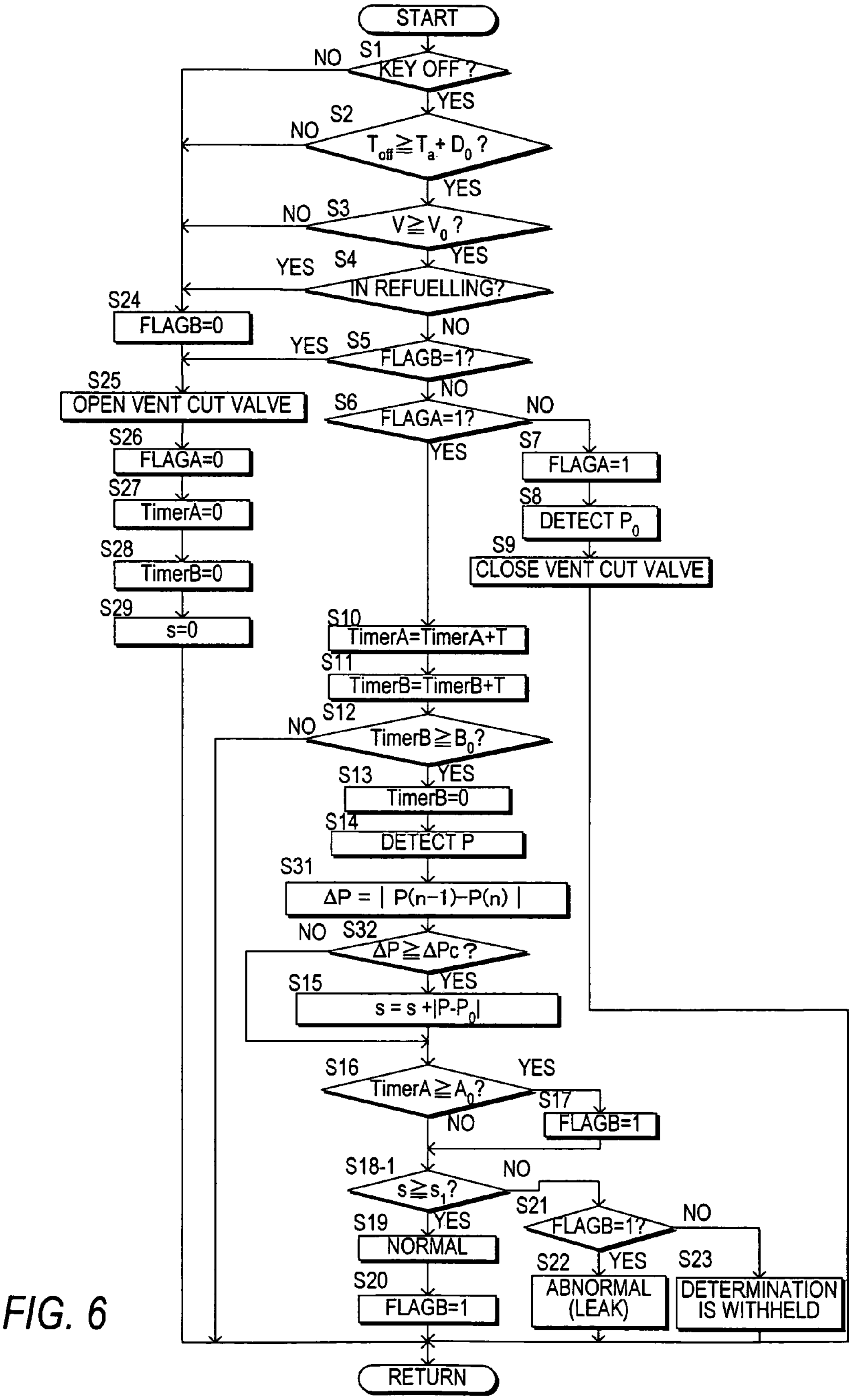
FIG. 6 is a flowchart showing a leak diagnosis routine in the second embodiment.

With reference to a flowchart in FIG. 6, a leak diagnosis routine will be described.

After the evaporation system pressure P has been detected in the step S14, a pressure change speed is calculated in a step S31. In this step, a difference $\Delta P$ between a last-detected pressure value $P(n-1)$ and a currently-detected pressure value $P(n)$ is calculated as a measure of the pressure change speed ($\Delta P=|P(n)-P(n-1)|$). It should be noted that n represents a number of times of execution of the routine after stoppage of the engine 21. In a step S32, it is then determined whether or not the difference $\Delta P$ is equal to or larger than a predetermined value $\Delta Pc$. The predetermined value $\Delta Pc$ is larger than a normal speed of change in the atmospheric pressure, and corresponds to, for example, 0.001 kPa/second. When the difference $\Delta P$ is equal to or larger than the predetermined value $\Delta Pc$, it is determined that the change $\Delta P$ in pressure results from a change in temperature or vapor gas generation amount in the evaporation system 1. Thus, the routine proceeds to the step S15. In the step S15, the integrated value s of pressure deviation amounts is calculated. On the other hand, when the difference $\Delta P$ is smaller than the predetermined value $\Delta Pc$, the change $\Delta P$ in pressure may result from a change in the atmospheric pressure. Thus, integration is not carried out and the routine proceeds to the step S16. The rest of the flowchart is the same as that of the first embodiment.

In this manner, only pressure deviations in the evaporation system 1 resulting from changes in vapor gas amount or temperature are integrated as the integrated value s, which is compared with a leak criterion value $s_1$. When the pressure change speed ($\Delta P$) is equal to or above the predetermined value $\Delta Pc$ in the step S32, an absolute value ($=|P-P_0|$) of a detected pressure deviation amount is added to a last integrated value $s(n-1)$ and the result of addition becomes a current integrated value $s(n)$. When the pressure change speed ($\Delta P$) is below the predetermined value $\Delta Pc$, the routine skips the step S15 and integration is suspended so that current integrated value $s(n)$ is set to the last integrated value $s(n-1)$. Thus, pressure deviations resulting from external factors such as a change in the atmospheric pressure and the like are restrained from being integrated into the integrated value s. As a result, the leak diagnosis can be more accurately carried out.

Next, a leak detecting device of a third embodiment will be described. The evaporation system 1 is identical in construction with that of the first embodiment. The following description will mainly focus on what is different from the first embodiment.

After the engine key switch 61 has been turned off, the temperature of the evaporation system 1 rises and the evaporation system pressure P thereby rises. In addition, the vapor gas evaporates into the gas phase and the evaporation system pressure P thereby rises. The vapor gas evaporates at a relatively high evaporation speed, and a pressure deviation on the positive pressure side shown in FIG. 2A may be detected immediately after the engine key switch 61 has been turned off even when there is a leak occurring. In contrast, since a pressure change on the negative pressure side results from a fall in temperature of the evaporation system 1 that is cooled by outside air, the pressure changes relatively gently on the negative pressure side. When there is a leak occurring in the evaporation system 1, outside air enters the evaporation system 1 from the leak holes, so no pressure change or a minor pressure change is caused.

In this embodiment, therefore, when the evaporation system pressure P is positive, the evaporation system 1 is once opened to equalize the pressure in the evaporation system 1 with the atmospheric pressure, and then absolute values of pressure deviation amounts are integrated. After the pressure in the evaporation system 1 has been equalized with the atmospheric pressure, the evaporation system 1 is sealed. Thus, the evaporation system pressure P changes toward the negative pressure side unless fuel evaporates further. In other words, only absolute values of pressure deviation amounts on the negative pressure side, which are unlikely to be detected when there is a leak occurring, are integrated, and a leak diagnosis is carried out according to the integrated value s.

Figure 7:
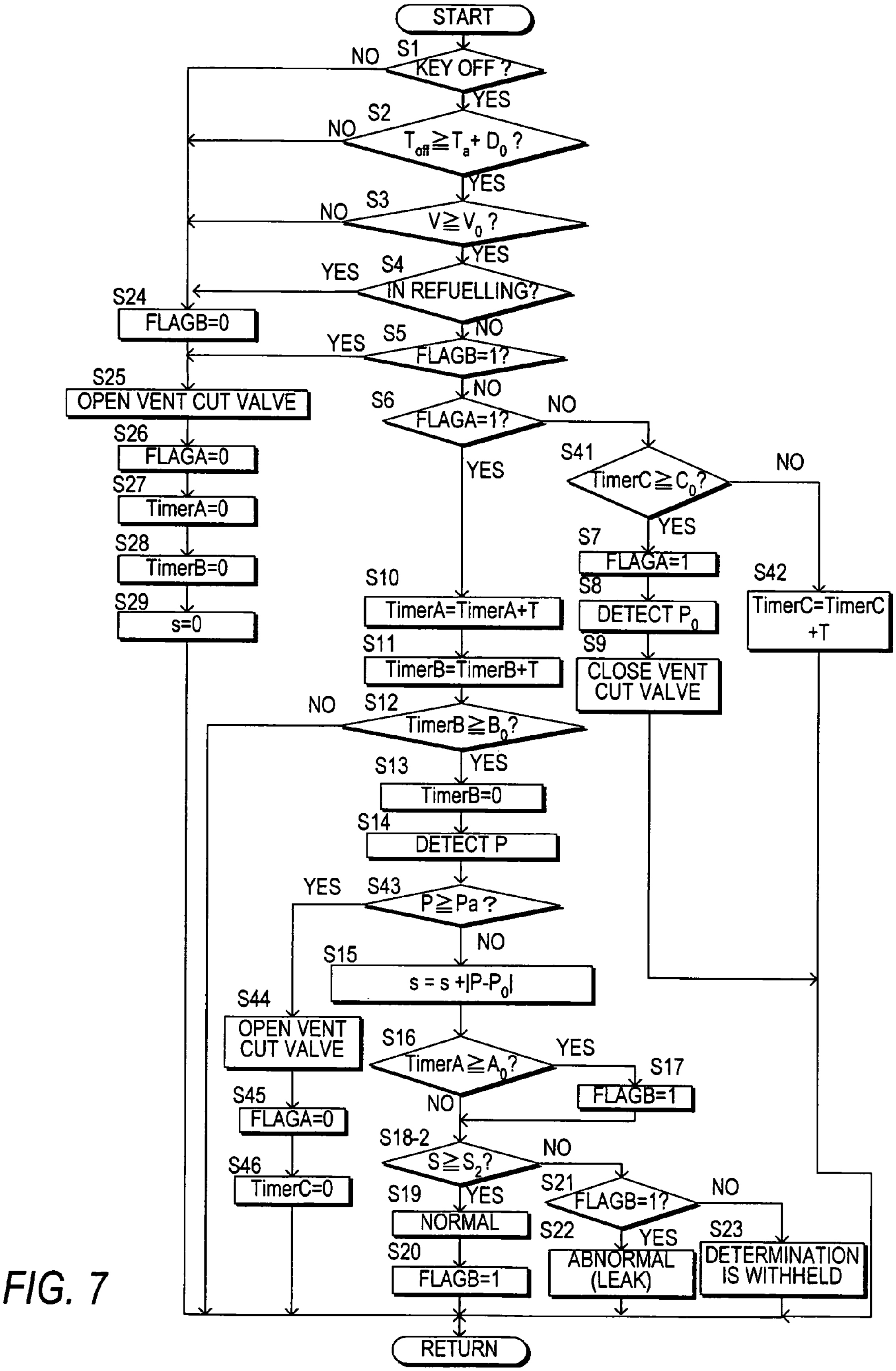
FIG. 7 is a flowchart showing a leak diagnosis routine in a third embodiment.

With reference to a flowchart of FIG. 7, a leak diagnosis routine will be described.

When leak diagnosis execution conditions are fulfilled in steps S1 to S5, it is determined in a step S6 whether or not FLAGA has been set to 1. When FLAGA has been set to 1, the routine proceeds to a step S10. When FLAGA is not 1, the routine proceeds to a step S41 where it is determined whether or not TimerC is equal to or larger than a predetermined value $C_0$. TimerC is a timer value for counting and measuring an elapsed time since the opening of the vent cut valve 5, namely, a time for which the evaporation system 1 is open to outside air. The predetermined value $C_0$ represents a time that is required until the pressure in the evaporation system 1 becomes equal to the atmospheric pressure after the evaporation system 1 has been opened to outside air (to the atmosphere), and is calculated in advance through an experiment. When TimerC is smaller than the predetermined value $C_0$, the routine proceeds to a step S42 where TimerC is counted. In other words, TimerC=TimerC+T. After that, the routine is terminated.

On the other hand, when it is determined that the timer value TimerC has become equal to or larger than the predetermined value $C_0$ and that the pressure in the evaporation system 1 has become equal to the atmospheric pressure, the routine proceeds to steps S7 to S9 where the leak diagnosis is started. Furthermore in the step S10 and steps S11 to S14, TimerA and TimerB are set and the evaporation system pressure P is detected. After the step S14, the routine proceeds to a step S43.

In the step S43, it is determined whether or not the evaporation system pressure P is equal to or higher than a predetermined value Pa. The predetermined value Pa represents a pressure slightly higher than the atmospheric pressure or substantially equal to the atmospheric pressure. In other words, it is determined whether or not the evaporation system pressure P is positive. When the evaporation system pressure P is equal to or higher than the predetermined value Pa (i.e., when the evaporation system pressure P is positive), the routine proceeds to a step S44. In the step S44, the vent cut valve 5 is opened and the evaporation system 1 is opened to outside air. Then in a step S45, FLAGA is set to 0 (FLAGA=0). In a step S46, TimerC is set to 0 (TimerC=0). After that, the routine is terminated. On the other hand, when the evaporation system pressure P is lower than the predetermined value Pa, the routine proceeds to a step S15. In the step S15, an integrated value s of pressure deviation amounts is calculated in the same manner as in the first embodiment. In steps S16 and S17, a determination on a duration time of the leak diagnosis is made. In a step S18-2, the integrated value s is compared with a predetermined value $s_2$. When the integrated value s is equal to or larger than the predetermined value $s_2$, the result is determined as normal. When the integrated value s is smaller than the predetermined value $s_2$, the leak diagnosis is withheld or the result is determined as abnormal.

In this manner, the leak diagnosis is carried out according to the integrated value s of amounts of pressure deviations on the negative pressure side, which are unlikely to be caused when there is a leak in the evaporation system 1. Thus, the leak diagnosis can be more accurately carried out.

As described above, when the pressure P in the evaporation system 1 is positive, the inside of the evaporation system 1 is once opened to outside air by controlling the vent cut valve 5. Thus, when there is no leak occurring, the pressure in the evaporation system 1 changes toward the negative pressure side after the evaporation system has been sealed. The pressure integration part (the step S15) performs integration only when the detected pressure P is negative. When the evaporation system pressure P is negative, the absolute values ($=|P-P_0|$) of pressure deviation amounts are integrated. When the evaporation system pressure P is not negative, the integrated value s does not change. Absolute values of pressure deviation amounts on the negative pressure side, which are unlikely to be detected when there is a leak occurring, are integrated. Therefore, the leak diagnosis can be more accurately carried out.

Although a determination on termination of the leak diagnosis (termination of integration of absolute values of pressure deviation amounts) is made according to the elapsed time (TimerA) in this embodiment, this is not obligatory. For instance, termination of the leak diagnosis may be determined according to a number of times of execution of the routine or the like.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-162942 (filed Jun. 1, 2004) are incorporated herein by reference.

What is claimed is:

1. A leak detecting device for a fuel vapor treatment unit that purges a vapor gas generated through evaporation of fuel in a fuel tank into an intake system of an engine, comprising:

a valve that can selectively seal the fuel vapor treatment unit;

a pressure detecting sensor that detects a pressure in the fuel vapor treatment unit; and a controller programmed to:

issue a command to close the valve with a view to sealing the fuel vapor treatment unit during stoppage of the engine;

calculate deviation amounts of the detected pressures during stoppage of the engine after the fuel vapor treatment unit has been sealed;

integrate absolute values of the deviation amounts, and determine, based on an integrated value, whether or not there is a leak occurring in the fuel vapor treatment unit.

2. The leak detecting device according to claim 1, wherein each of the pressure deviation amounts is a difference between a detected pressure and a reference pressure, and wherein the reference pressure is a pressure in the fuel vapor treatment unit which is detected at a time point when the fuel vapor treatment unit is sealed.

3. The leak detecting device according to claim 1, wherein the controller comprises a timer that counts an elapsed time since the issuance of the command to close the valve, and wherein the controller is programmed to determine that there is a leak occurring when the integrated value is smaller than a predetermined leak criterion value after a value of the timer has reached a predetermined value.

4. The leak detecting device according to claim 1, wherein the controller comprises a timer that counts a duration time of a leak diagnosis for determining whether or not there is a leak occurring, and wherein the controller is programmed to determine that there is a leak occurring when the pressure integrated value is smaller than a predetermined leak criterion value when the duration time is equal to or larger than a predetermined upper limit.

5. The leak detecting device according to claim 1, wherein the controller is programmed to integrate the deviation amounts only when a pressure change speed is equal to or higher than a predetermined value.

6. The leak detecting device according to claim 1, wherein the controller is programmed to issue a command to open the valve with a view to opening the fuel vapor treatment unit to outside air when a detected pressure in the fuel vapor treatment unit is positive.

7. The leak detecting device according to claim 6, wherein the controller is programmed to integrate the deviation amounts only when the detected pressures are smaller than a predetermined value.

8. The leak detecting device according to claim 1, further comprising an engine key switch, wherein the controller is programmed to determine that the engine is stopped when the engine key switch is OFF.

9. The leak detecting device according to claim 1, further comprising a sensor that detects a temperature of fuel in the fuel tank, wherein the controller is programmed to refrain from determining whether or not there is a leak occurring when a fuel temperature at a time point at which the engine key switch is turned off is lower than a reference temperature.

* * * * *